United States Patent
Pippert et al.

(10) Patent No.: US 7,933,595 B2
(45) Date of Patent: *Apr. 26, 2011

(54) DYNAMIC SELECTION BY A MOBILE STATION OF ITS HOME AGENT USING ITS PREFERRED ROAMING LIST (PRL)

(75) Inventors: Robert C. Pippert, Lenexa, KS (US);
Joseph E. Bennett, Olathe, KS (US);
Ryan S. Talley, Olathe, KS (US);
Joseph I. Schield, Lee's Summit, MO (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/774,428

(22) Filed: May 5, 2010

(65) Prior Publication Data

US 2010/0214989 A1 Aug. 26, 2010

Related U.S. Application Data

(63) Continuation of application No. 11/337,714, filed on Jan. 23, 2006, now Pat. No. 7,747,251.

(51) Int. Cl.
*H04W 4/00* (2009.01)

(52) U.S. Cl. ............... 455/432.1; 455/432.2; 455/435.1; 455/435.2; 455/435.3; 455/558; 455/550.1; 370/338; 370/352; 370/389; 709/245; 709/246; 709/249

(58) Field of Classification Search ............... 455/432.1, 455/432.2, 434, 435.1, 435.2, 435.3, 550.1, 455/551, 552.1, 558, 556.2, 432.3, 433, 436, 550, 553.1, 41.2; 370/329, 338, 381, 382, 383, 389, 392, 395.31, 351, 352, 401, 328; 709/245, 246, 249

See application file for complete search history.

(56) References Cited

U.S. PATENT DOCUMENTS

| | | | |
|---|---|---|---|
| 5,613,213 A | 3/1997 | Naddell et al. | |
| 6,901,395 B2 * | 5/2005 | Andrus et al. | 707/1 |
| 6,978,317 B2 * | 12/2005 | Anantha et al. | 709/249 |
| 7,085,579 B2 * | 8/2006 | Mizutani et al. | 455/512 |
| 7,139,587 B2 | 11/2006 | Ishii | |
| 7,260,394 B2 * | 8/2007 | Welnick et al. | 455/432.1 |
| 7,283,507 B2 * | 10/2007 | Buckley et al. | 370/338 |
| 7,343,158 B2 | 3/2008 | Mizell et al. | |

(Continued)

OTHER PUBLICATIONS

Calhoun and Perkins, "Mobile IP Dynamic Home Address Allocation Extensions," IETF Internet-Draft, Nov. 1998.

(Continued)

*Primary Examiner* — Charles N Appiah
*Assistant Examiner* — Olumide T Ajibade-Akonai (57) ABSTRACT

Methods and systems are provided for dynamic selection by a mobile station of its home agent using its preferred roaming list (PRL). A mobile station maintains a PRL comprising an association between (i) a first set of data identifying a first wireless wide area network (WWAN) and (ii) a first identifier of a first home agent. The mobile station detects a broadcast of the first set of data by the first WWAN. Responsive to detecting the broadcast of the first set of data by the first WWAN, the mobile station connects to the first WWAN. Responsive to connecting to the first WWAN, the mobile station uses the first identifier to register with the first home agent.

20 Claims, 4 Drawing Sheets

U.S. PATENT DOCUMENTS

| | | |
|---|---|---|
| 7,349,695 B2 | 3/2008 | Oommen et al. |
| 7,509,122 B2 | 3/2009 | Xue et al. |
| 7,593,730 B2 * | 9/2009 | Khandelwal et al. ...... 455/435.2 |
| 7,734,290 B2 * | 6/2010 | Juneja et al. .................. 455/434 |
| 7,747,251 B1 * | 6/2010 | Pippert et al. .............. 455/432.1 |
| 2002/0168976 A1 | 11/2002 | Krishnan |
| 2003/0073439 A1 | 4/2003 | Wenzel et al. |
| 2005/0111483 A1 | 5/2005 | Cripe et al. |
| 2007/0117585 A1 | 5/2007 | Juneja et al. |
| 2007/0155421 A1 | 7/2007 | Alberth et al. |

OTHER PUBLICATIONS

Calhoun and Perkins, "Mobile IP Foreign Agent Challenge/Response Extension," IETF Internet-Draft, Nov. 1998.

Gustafsson et al., "Requirements on Mobile IP from a Cellular Perspective," IETF Internet-Draft, Feb. 1999.

Perkins (Editor), "IP Mobility Support," RFC 2002, Oct. 1996.

Chen and Boult, "Dynamic Home Agent Reassignment in Mobile IP."

Chen and Boult, "Dynamic Home Agent Reassignment in Moblie IP," 2002 IEEE, Aug. 2002.

* cited by examiner

ACQUISITION TABLE 302

| INDEX | FREQUENCY |
|-------|-----------|
| 1 | WWAN_111 |
| 2 | WWAN_112 |
| 3 | WWAN_113 |
| 4 | WWAN_114 |
| 5 | WWAN_115 |

310, 312, 314, 316, 318

SYSTEM TABLE 304

| SYSTEM | PREF | HA | INDEX |
|--------|------|-----|-------|
| SID_NID_1 | 1 | HA_121 | 1 |
| SID_NID_2 | 2 | HA_122 | 2 |
| SID_NID_3 | 3 | HA_123 | 3 |
| SID_NID_4 | 4 | HA_124 | 4 |
| SID_NID_5 | 5 | HA_125 | 5 |

320, 322, 324, 326, 328

PRL 300

FIG. 4

DYNAMIC SELECTION BY A MOBILE STATION OF ITS HOME AGENT USING ITS PREFERRED ROAMING LIST (PRL)

REFERENCE TO RELATED APPLICATIONS

This is a continuation of U.S. patent application Ser. No. 11/337,714, filed Jan. 23, 2006, the entirety of which is hereby incorporated by reference.

BACKGROUND

1. Technical Field

The present invention relates to wireless data communication and, more particularly, to improving packet-data communication for mobile stations via wireless wide area networks.

2. Description of Related Art

More people than ever are using mobile stations, such as cell phones and personal digital assistants (PDAs), to connect to wireless wide area networks (WWANs), which are also referred to as wireless communication systems, cellular communication systems, wireless networks, radio access networks, wireless access networks, and by other names. Service providers typically operate these WWANs to provide both voice and data services using a wireless communication format such as Code Division Multiple Access (CDMA), or another format.

Mobile stations (such as cellular telephones) typically store a "preferred roaming list" (PRL), which includes a prioritized listing of communication systems (such as WWANs) that the mobile station may access. In a CDMA system for instance, a PRL typically includes (i) an "acquisition table" that instructs the mobile station as to which radio frequency (RF) channels to search and (ii) a "system table" that specifies, for each allowed system, a system identification code (SID) and a network identification code (NID). Each CDMA base station broadcasts its SID and NID in system overhead messages. Thus, when a mobile station detects an allowed SID-and-NID combination, the mobile station may connect to the identified system.

In practice, an initial or default PRL is typically loaded into a mobile station before a wireless carrier distributes the mobile station to a subscriber. The carrier may thereafter load a new PRL into the mobile station using a physical connection (perhaps at a customer service center) or perhaps by using over-the-air service provisioning (OTASP), relevant aspects of which are described in "Over-the-Air Service Provisioning of Mobile Stations in Spread Spectrum Systems," EIA/TIA IS-683-C (Mar. 20, 2003), which is incorporated herein by reference. In operation, mobile stations connect with various WWANs listed on their PRLs according to the listed priorities, and perhaps according to other logic.

As mentioned above, mobile stations connect to WWANs to engage in both voice and packet-data communications. The packet-data communications may take the form of, as examples, web-browsing communications, e-mail communications, Voice over Internet Protocol (VoIP) communications, and/or any other type of packet-data communications. To engage in these packet-data communications, mobile stations may use a packet-switched protocol such as the Internet Protocol (IP), relevant aspects of which are described in "Internet Protocol," RFC 791 (September 1981), which is incorporated herein by reference.

Furthermore, to handle their own mobility, some mobile stations may use a mobility protocol known as "Mobile IP," relevant aspects of which are described in "IP Mobility Support for IPv4," RFC 3344 (August 2002), which is incorporated herein by reference. Mobile IP is essentially a way of constructing and routing IP packets to allow devices to change their point of attachment to the Internet while maintaining an at least semi-permanent IP address, known as a "home address," to which other nodes may address packets.

In Mobile IP, mobile stations have a particular network known as a "home network." When the mobile station is attached to its home network, it may receive packet data addressed to its home address on that network. When the mobile station is attached to another network, known as a "foreign network," the mobile station acquires a "care-of address." This address may be either an address assigned to the mobile station on the foreign network ("co-located care-of address"), or an address of a device on the foreign network known as a "foreign agent," through which the mobile station conducts communications ("foreign-agent care-of address").

Either way, the mobile station registers the care-of address with a device on its home network known as a "home agent." When other nodes on the Internet address packets to the mobile station's home address, those packets will be routed to the mobile station's home network. There, the home agent intercepts the packets and uses encapsulation to tunnel the packets to the mobile station's registered care-of address. In the case of a co-located care-of address, the packets will arrive at the mobile station, which will then decapsulate the packets. In the case of a foreign-agent care-of address, the packets will arrive at the foreign agent, which will decapsulate the packets and then forward them to the mobile station.

Thus, packets sent to the mobile station from other nodes on the Internet are routed to the mobile station's home agent, and then to the mobile station. Packets sent from the mobile station to other nodes may or may not traverse the mobile station's home agent. If "triangular routing" is used, the mobile station addresses the outgoing packets directly to those other nodes. If "reverse tunneling" is used, the mobile station encapsulates packets that are addressed to the other nodes inside packets addressed to the home agent. Those packets are received by the home agent, decapsulated, and then forwarded to the other nodes.

In general, the greater the distance and number of nodes a packet must traverse, the more time it will take the packet to arrive at its destination. Conversely, the smaller the distance and number of nodes a packet must traverse, the less time it will take the packet to arrive at its destination. Thus, in the context of Mobile IP, the choice of a mobile station's home agent could impact the amount of time that packets sent to (and perhaps by) the mobile node take to reach their destination. Furthermore, this choice may also impact the amount of traffic a given network or group of networks is tasked with handling: the longer the packets take to reach their destination, the larger the number of packets that will be traveling at any given time.

SUMMARY

Methods and systems are provided for dynamic selection by a mobile station of its home agent using its PRL. In one embodiment, the present invention may take the form of a method. In accordance with the method, a mobile station maintains a PRL that includes an association between (i) a first set of data identifying a first WWAN and (ii) a first identifier of a first home agent. The mobile station detects a broadcast of the first set of data by the first WWAN. Responsive to detecting the broadcast of the first set of data by the first WWAN, the mobile station connects to the first WWAN.

Responsive to connecting to the first WWAN, the mobile station uses the first identifier to register with the first home agent.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

As presently contemplated, a mobile station maintains a PRL that includes an association between a first WWAN and a first home agent. In addition, the PRL may include associations between additional WWANs and additional home agents. When the mobile station connects to the first WWAN, the mobile station may then, with reference to its PRL, conduct a Mobile-IP registration with the first home agent. Advantageously, this may allow the mobile station to engage in Mobile-IP communication using a conveniently-located home agent. Also, because the mobile station's PRL may be updated from time to time using, for example, an over-the-air process, a wireless carrier may periodically change the associations between WWANs and home agents used by the mobile station.

The PRL may contain specific data identifying the first WWAN. For example, in CDMA systems, this data may take the form of a System Identification Code (SID) and a Network Identification Code (NID). Furthermore, the PRL may contain a number of RF channels on which the mobile station should search for SID-NID combinations. Thus, the mobile station may scan on one of those channels, locate the SID-NID pair that identifies the first WWAN, and responsively connect to the first WWAN that is broadcasting this SID-NID information.

The mobile station may then use an association in its PRL between that SID-NID pair and an identifier of the first home agent. That identifier could be a hostname, an IP address, or some other unique identifier. In the case of the identifier being a hostname, the mobile station (or another entity on behalf of the mobile station) may perform a Domain Name System (DNS) query to identify an IP address. Either way, once the mobile station has the IP address of the first home agent, the mobile station may engage in a Mobile-IP registration with that home agent, and thereafter engage in Mobile-IP data communications using that home agent.

In certain circumstances, at the time the mobile station connects to the first WWAN as described above, the mobile station may already be registered with another home agent and engaged in a data session using that other home agent. To maintain data connectivity and allow that data session to end normally, the mobile station may wait to register with the first home agent until that data session has completed. In fact, the mobile station may conduct a Mobile-IP re-registration with that other home agent via the first WWAN. Following the data session, the mobile station may then conduct a Mobile-IP registration with the first home agent.

2. Exemplary Architecture a. Exemplary Communication System

Figure 1:
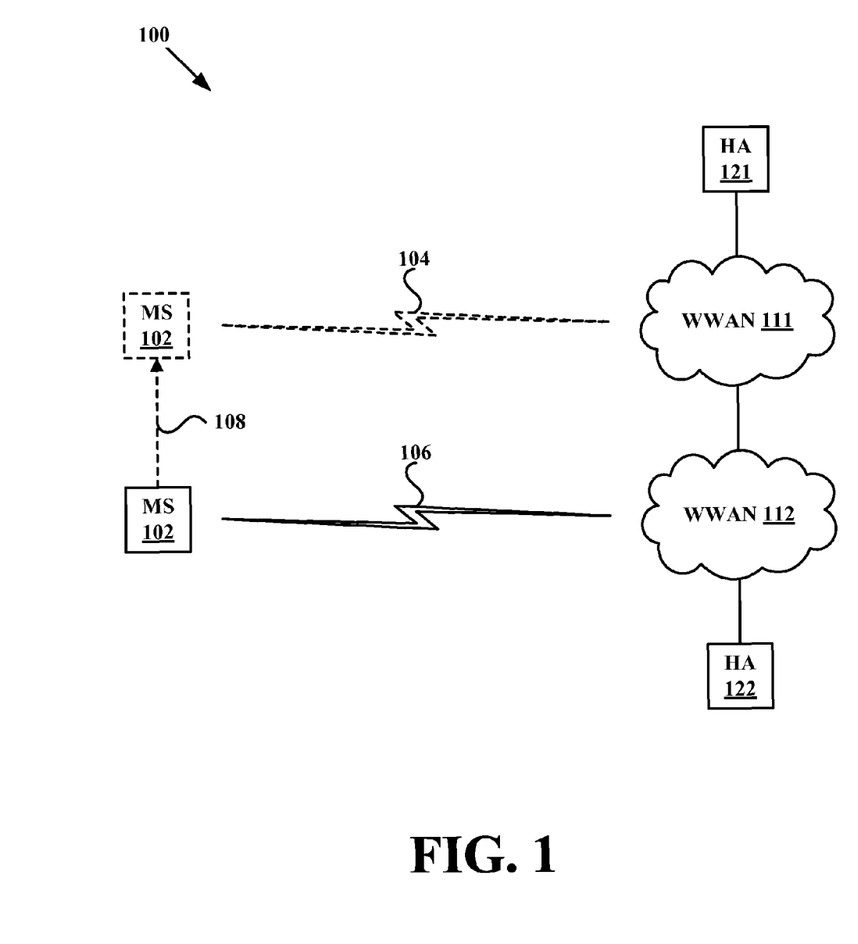
FIG. 1 is a simplified block diagram of a communication system that may be used in accordance with exemplary embodiments.

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a mobile station 102, RF air interfaces 104 and 106, WWANs 111 and 112, and home agents 121 and 122. It should be understood that any number of other entities could be present as well. For example, there could be any number of mobile stations and other devices in communication with WWAN 111. Furthermore, there could be any number of routers, other devices, and/or networks making up all or part of any of the communication links, such as the link between WWAN 111 and HA 121.

Mobile station 102 may be any mobile device capable of communicating with one or more WWANs, such as WWAN 111, and of carrying out the mobile-station functions described herein. As examples, mobile station 102 could be a cellular telephone, PDA, laptop computer, or perhaps a multi-mode device, capable of communicating with WWANs and wireless local area networks (WLANs). Mobile station 102 may communicate with WWAN 111 over RF air interface 104 using a protocol such as CDMA. In particular, mobile station 102 may use a protocol known as cdma2000®, described in "CDMA 2000® Series," TIA/EIA/IS-2000 Series, Rev. A (March 2000), which is incorporated herein by reference.

WWANs 111 and 112 may each be any type of WWAN capable of communicating (i) over an RF air interface with one or more mobile stations and (ii) with one or more other devices such as one or more home agents. WWANs 111 and 112 may be communicatively linked with each other, as shown in FIG. 1. With regard to internal structure, each of WWANs 111 and 112 may include one or more of the following components, which are known in the art, as are methods of interconnecting them: base transceiver station (BTS), base station controller (BSC), mobile switching center (MSC), packet data serving node (PDSN), circuit-switched network, packet-switched network, and/or any other components necessary to enable voice and packet-data communication with one or more mobile stations, as well as circuit-switched and/or packet-switched communications with one or more other entities or networks. As examples, the WWANs may be connected to the Internet and the Public Switched Telephone Network (PSTN).

Home agents 121 and 122 may be any network devices such as servers, arranged to carry out the home-agent functions described herein. Mobile-IP home agents are known in the art, and thus are not described in detail here.

FIG. 1 also includes an arrow 108 extending from a solid representation of mobile station 102 to a dashed representation of mobile station 102. Furthermore, RF air interface 104 is depicted in dashed form, while RF air interface 106 is depicted in solid form. The arrow 108, the dashed mobile station 102, and the dashed RF air interface 104 are meant to represent movement by mobile station 102 from a first situation to a second situation. The first situation is mobile station 102 communicating over RF air interface 106 with WWAN 112, which is associated with home agent 122. The second situation is mobile station 102 communicating over RF air interface 104 with WWAN 111, which is associated with home agent 121.

b. Exemplary Mobile Station
i. General Structure

Figure 2:
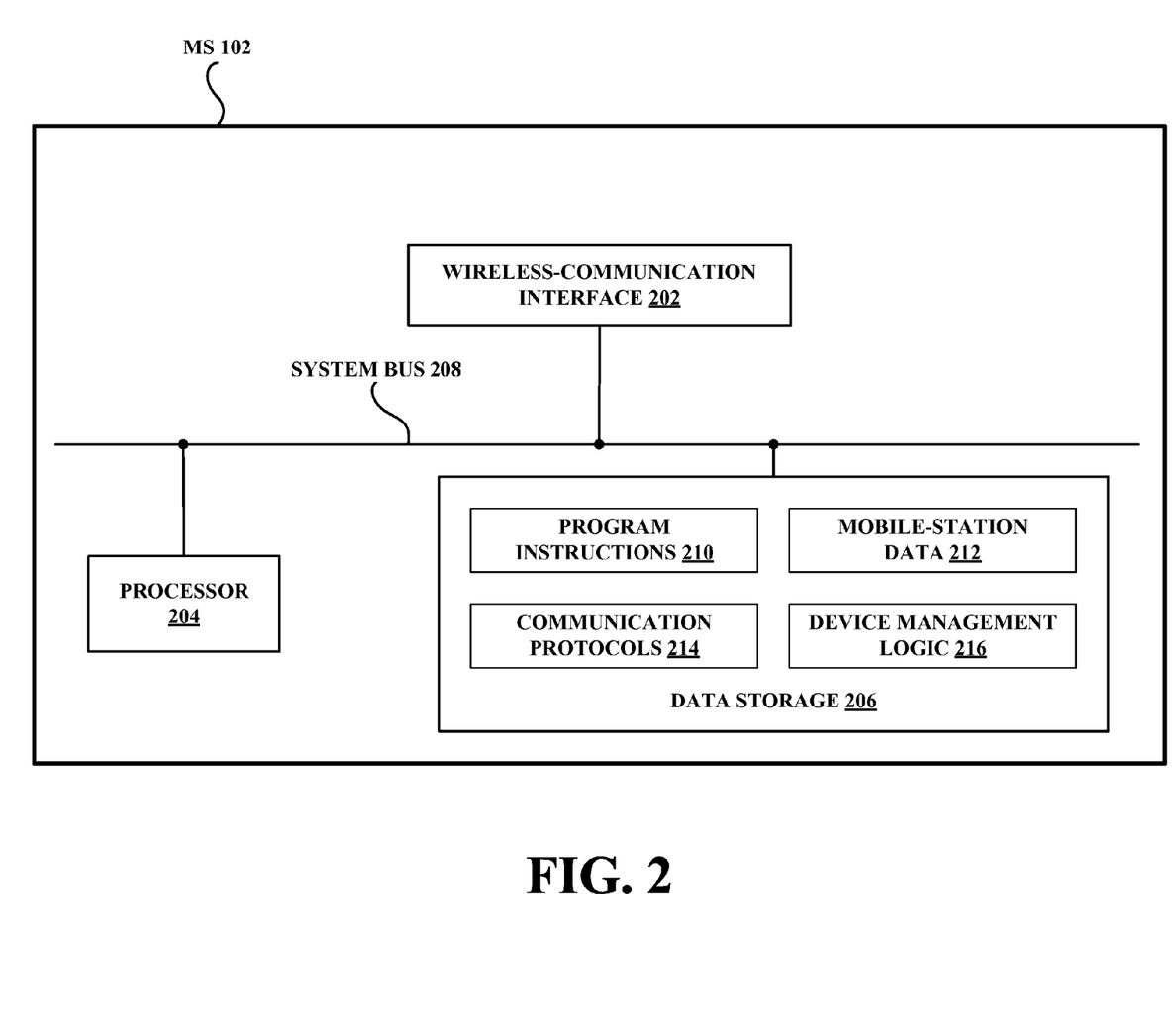
FIG. 2 is a simplified block diagram of an exemplary mobile station that may be used in accordance with exemplary embodiments.

FIG. 2 is a simplified block diagram of an exemplary mobile station that may be used in accordance with exemplary embodiments. In particular, FIG. 2 shows that mobile station 102 includes a wireless-communication interface 202, a processor 204, and data storage 206, all of which may be communicatively linked by a system bus 208.

Wireless-communication interface 202 may be any combination of hardware and software that mobile station 102 uses to communicate over an RF air interface with a WWAN. As such, wireless-communication interface 202 may comprise a chipset suitable for CDMA communication, and perhaps an antenna.

Processor 204 may comprise multiple (e.g., parallel) processors, such as a general purpose microprocessor and/or a discrete digital signal processor. Data storage 206 may take various forms, in one or more parts, such as a non-volatile storage block and/or a removable storage medium. Data storage 206 may store program instructions 210, mobile-station data 212, communication protocols 214, and device management logic 216. Program instructions 210 may be executable by processor 204 to carry out various mobile-station functions described herein. Mobile-station data 212 may include a PRL, and may also include any other types of data.

Communication protocols 214 may be useful to receive data from and send data to one or more network entities, and may include any protocols mentioned herein, any proprietary protocols, and/or any other protocols. Compatible protocols may be stored in other entities in communication with mobile station 102. Device management logic 216 may be used to manage aspects of mobile station 102 such as memory and file management.

ii. Exemplary Preferred Roaming List

Figure 3:
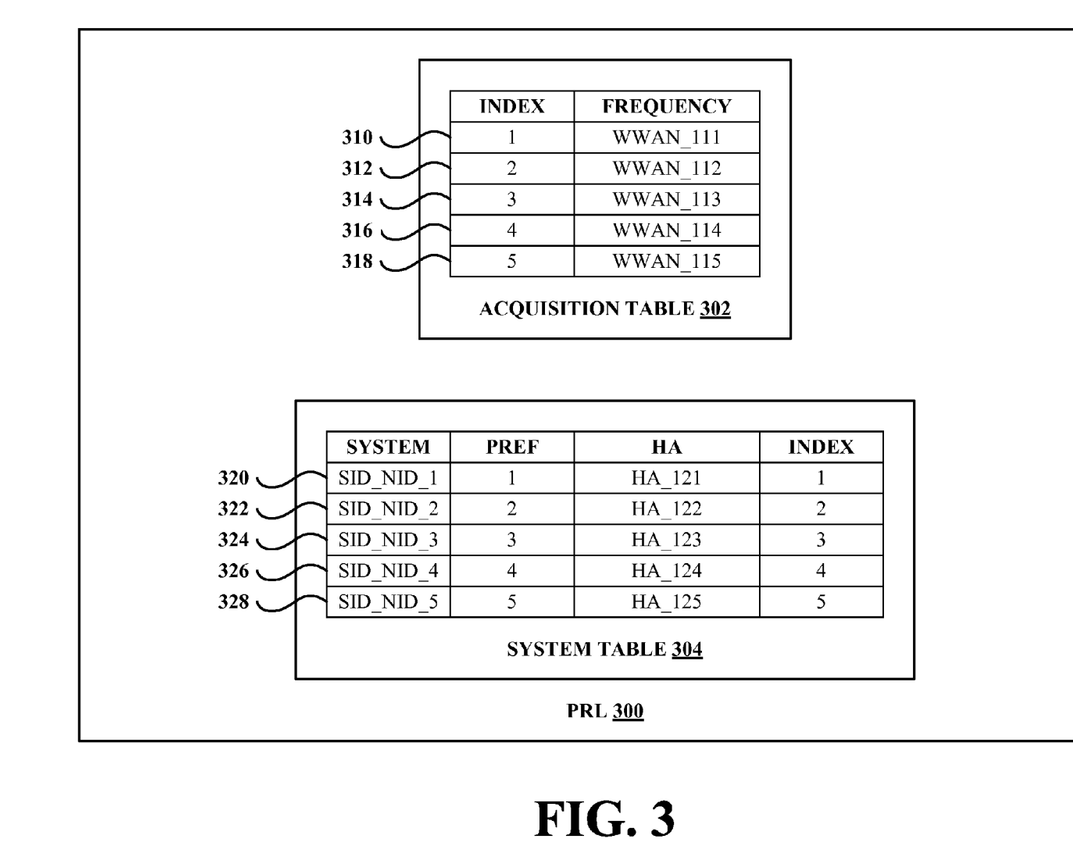
FIG. 3 is a simplified block diagram of an exemplary preferred roaming list that may be used in accordance with exemplary embodiments.

FIG. 3 is a simplified block diagram of an exemplary preferred roaming list that may be used in accordance with exemplary embodiments. In particular, FIG. 3 illustrates a PRL 300 that may be stored as mobile-station data 212. PRL 300 comprises an acquisition table 302 and a system table 304. It should be understood, however, that PRL 300 could take other forms, and store other types of data as well; furthermore, the various parts of PRL 300 could be stored in a single storage medium or among separate storage media.

In this example, acquisition table 302 has five rows, each containing an index for that particular row and an RF frequency on which mobile station 102 may search for a WWAN to which to connect. As shown in FIG. 3, row 310 contains the index "1" and an RF channel represented as "WWAN_111," indicating this is an RF frequency on which WWAN 111 of FIG. 1 operates. Note that "WWAN_111" is a representation, and that the entries in acquisition table 302 may contain numerical representations of RF channels.

Row 312 contains an index "2" and an RF frequency "WWAN_112," on which WWAN 112 operates. In this example, WWANs 111 and 112 are CDMA networks, each operating on at least one particular frequency or CDMA channel. As such, the frequencies listed in acquisition table 302 for those respective CDMA networks would aid mobile station 102 in detecting and connecting to those particular networks.

Rows 314, 316, and 318 respectively contain an index "3" paired with a frequency for a WWAN designated WWAN 113, an index "4" paired with a frequency for a WWAN designated WWAN 114, and an index "5" paired with a frequency for a WWAN designated WWAN 115. The reader should bear in mind that an actual acquisition table in an actual mobile station could have more or less entries than are illustrated in acquisition table 302.

Depicted below acquisition table 302 is system table 304. Note that the indexes listed in rows 310-318 of acquisition table 302 respectively match the indexes listed in rows 320-328 of system table 304, and that each row of system table 304 contains system-identifying data ("SYSTEM"), a preference indicator ("PREF"), an identifier for a particular home agent ("HA"), and the aforementioned indexes ("INDEX"). Other data may also be included in a system table.

With respect to rows 320 and 322, system-identifying data is given for WWAN 111 and WLAN 112, respectively. The matching index "1" in rows 310 and 320 indicates that those rows pertain to WWAN 111, while the matching index "2" in rows 312 and 322 indicate that those rows pertain to WWAN 112. Rows 314 and 324, rows 316 and 326, as well as rows 318 and 328 pertain to WWANs that are not depicted in FIG. 1.

With respect to the values listed in system table 304, in addition to the "INDEX" values, which serve to coordinate between the two tables, the "SYSTEM" column contains SID-NID pairs as described above, each of which identify a particular WWAN. Every CDMA system is uniquely identified by the combination of SID, NID, and radio frequency. It can be appreciated that, taken together, acquisition table 302 and system table 304 provide this combination for WWAN 111 and WWAN 112. CDMA base stations typically broadcast their respective SID and NID in system overhead messages. Thus, once mobile station 102 detects a WWAN listed on its PRL by searching the frequency listed in acquisition table 302, the mobile station can verify the identity of the network by matching the SID and NID broadcast on that frequency to the SID and NID stored in its system table 304.

The "PREF" column may indicate that mobile station 102 should prefer certain WWANs over others. Furthermore, it may be the case that a lower number in this column is associated with a greater preference. For example, given a choice between WWAN 111 and WWAN 112, mobile station 102 may opt for WWAN 111 based on the "PREF" column.

Moreover, the "HA" column contains identifiers for particular home agents. These identifiers could be hostnames, IP addresses, or any other data values (or sets of data values) that uniquely identify a home agent. In this example, these identifiers are represented as HA_121, HA_122, etc. Thus, row 320 contains an identifier for home agent 121 of FIG. 1, while row 322 contains an identifier 322 for home agent 122.

Thus, in this example, PRL 300 of mobile station 102 contains entries for five WWANs that mobile station 102 may access. Namely, mobile station 102 may access WWANs 111 through 115. PRL 300 further includes an identifier for a home agent associated with each of these WWANs. Note that any particular home agent could be associated with more than one WWAN. Furthermore, PRL 300 could also contain information pertaining to whether a roaming indication should be displayed by mobile station 102 while it is connected to each respective WWAN. PRL 300 may also contain a list of WWANs that mobile station 102 is prohibited from accessing, as well as other types of data, such as geographical data regarding the WWANs.

3. Exemplary Operation

Figure 4:
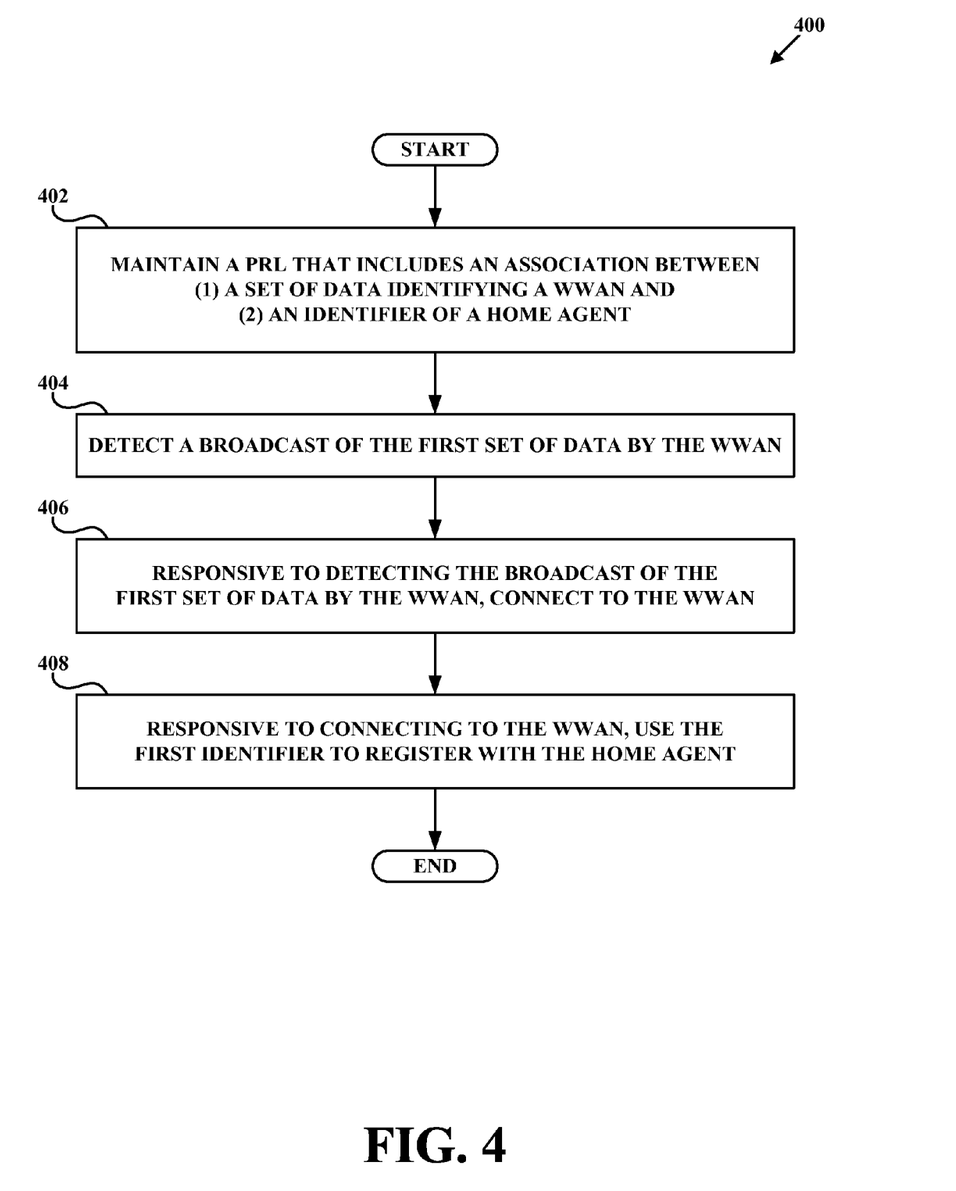
FIG. 4 is a flowchart of a first exemplary method that makes use of the communication system of FIG. 1, in accordance with exemplary embodiments.

FIG. 4 is a flowchart of a first exemplary method that makes use of the communication system of FIG. 1, in accordance with exemplary embodiments. As shown in FIG. 4, the method 400 begins at step 402, when mobile station 102 maintains a PRL that includes an association between (i) a first set of data identifying WWAN 111 and (ii) a first identifier of home agent 121. At step 404, mobile station 102 detects a broadcast of the first set of data by WWAN 111. At step 406, responsive to detecting the broadcast of the first set of data by WWAN 111, mobile station 102 connects to WWAN 111. At step 408, responsive to connecting to WWAN 111, mobile station 102 uses the first identifier to register with home agent 121. These steps are further explained in the following subsections.

a. Maintain a PRL Associating a WWAN with a Home Agent

At step 402, mobile station 102 maintains a PRL that includes an association between (i) a first set of data identifying WWAN 111 and (ii) a first identifier of home agent 121. As an example, the mobile station may store PRL 300, which includes acquisition table 302 and system table 304. Acquisition table 302 includes an index ("1") associated with an RF channel ("WWAN_111"). Furthermore, system table 304 includes the same index associated with both the first set of data ("SID_NID_1") and the first identifier ("HA_121"). In this example, the first set of data therefore includes both a SID and a NID, but could take other forms. Also, the first identifier may be a hostname, an IP address, or some other identifier.

b. Detect a Broadcast by the WWAN

At step 404, mobile station 102 detects a broadcast of the first set of data by WWAN 111. Prior to step 404, mobile station 102 may scan one or more of the RF channels on acquisition table 302 for data identifying one or more WWANs. Mobile station 102 may detect that WWAN 111 is broadcasting its SID and NID ("SID_NID_1") on an RF channel ("WWAN_111").

c. Connect to the WWAN

At step 406, responsive to detecting the broadcast of the first set of data by WWAN 111, mobile station 102 connects to WWAN 111. Step 406 may take the form of mobile station registering for service with WWAN 111, in a manner known in the art. Note that step 406 refers to registration for service on a wireless network, not to registration with a home agent.

d. Register with the Home Agent

At step 408, responsive to connecting to WWAN 111, mobile station 102 uses the first identifier to register with home agent 121. Home agent 121 may be a Mobile-IP home agent, and mobile station 102 may carry out step 408 by engaging in a Mobile-IP registration with the home agent. As such, step 408 may involve mobile station 102 sending a registration request, perhaps via a foreign agent, to home agent 121. This request could include an IP address of the foreign agent as the mobile station's care-of address. The home agent may store an association between a home address of mobile station 102 and that care-of address.

Step 408 may further involve home agent 121 sending a registration reply to mobile station 102 via the foreign agent. Upon receipt of the registration reply, the foreign agent may store an association between the home address of mobile station 102 and information—such as point-to-point protocol ("PPP") information—that the foreign agent may use to communicate with mobile station 102. The foreign agent may then forward the reply to mobile station 102. Mobile station 102 may then engage in Mobile-IP communication using the foreign agent.

At the time mobile station 102 connects to WWAN 111, mobile station 102 may be (i) already engaged in a data session via home agent 122 and (ii) registered with home agent 122. This session may have started when mobile station 102 was connected to WWAN 112. In this situation, mobile station 102 may wait until after that session to register with home agent 121. In fact, to continue that session, mobile station 102 may conduct a Mobile-IP re-registration with home agent 122 via WWAN 111, to inform home agent 122 of the new care-of address of mobile station 102. As described above, PRL 300 may include an association between (i) a set of data identifying WWAN 112 and (ii) an identifier of home agent 122, as shown in rows 312 and 322.

4. Conclusion

Although the present invention has been described in the context of Mobile IP, it could also be applied in the context of Simple IP. In that case, the home agents would not be Mobile-IP home agents, but rather simple network access servers (such as PDSNs) that provide packet-data service to mobile stations. In this sense, the registration of step 408 would take the form of a mobile station requesting and receiving an IP address from the "home agent." The same types of advantages could be achieved in this context, in that mobile stations would select a network access server through which to communicate with reference to their PRL, and the network access servers could be located at a point on the network that would be convenient and efficient.

Various exemplary embodiments have been described above. Those skilled in the art will understand, however, that changes and modifications may be made to those examples without departing from the scope of the claims.

What is claimed is:

1. A method comprising:
   a mobile station maintaining a preferred roaming list (PRL), the PRL comprising (1) a first association between (i) a first set of data identifying a first wireless wide area network (WWAN) and (ii) a first identifier of a first home agent and (2) a second association between (i) a second set of data identifying a second WWAN and (ii) a second identifier of a second home agent;
   the mobile station detecting a broadcast of the first set of data by the first WWAN;
   responsive to detecting the broadcast of the first set of data by the first WWAN, the mobile station connecting to the first WWAN; and
   responsive to connecting to the first WWAN, and with reference to the PRL, the mobile station using the first identifier to register with the first home agent.

2. The method of claim 1, wherein the PRL comprises an acquisition table and a system table, wherein the acquisition table comprises an index associated with a radio-frequency (RF) channel, and wherein the system table comprises the index associated with both the first set of data and the first identifier.

3. The method of claim 1, wherein the first set of data comprises at least one of a system identification code (SID) and a network identification code (NID).

4. The method of claim 1, wherein the first home agent is a Mobile Internet Protocol (Mobile IP) home agent.

5. The method of claim 4, wherein the mobile station using the first identifier to register with the first home agent comprises the mobile station using the first identifier to conduct a Mobile-IP registration with the first home agent.

6. The method of claim 1, further comprising the mobile station scanning at least one radio-frequency (RF) channel for data identifying a WWAN.

7. The method of claim 1, wherein the mobile station using the first identifier to register with the first home agent comprises the mobile station sending a registration request to the first home agent via a foreign agent.

8. The method of claim 7, wherein the mobile station using the first identifier to register with the first home agent further comprises the mobile station receiving a registration reply from the first home agent.

9. The method of claim 1, wherein the first home agent is a network access server.

10. The method of claim 1, wherein the mobile station is a mobile station selected from the group consisting of a cellular telephone, a personal digital assistant (PDA), and a laptop computer.

11. A mobile station comprising:
a wireless-communication interface;
a processor; and
data storage having stored therein (i) a preferred roaming list (PRL), the PRL comprising (1) a first association between (a) a first set of data identifying a first wireless wide area network (WWAN) and (b) a first identifier of a first home agent and (2) a second association between (a) a second set of data identifying a second WWAN and (b) a second identifier of a second home agent and (ii) instructions executable by the processor to:
detect a broadcast of the first set of data by the first WWAN;
responsive to detecting the broadcast of the first set of data by the first WWAN, connect to the first WWAN; and
responsive to connecting to the first WWAN, and with reference to the PRL, use the first identifier to register with the first home agent.

12. The mobile station of claim 11, wherein the PRL comprises an acquisition table and a system table, wherein the acquisition table comprises an index associated with a radio-frequency (RF) channel, and wherein the system table comprises the index associated with both the first set of data and the first identifier.

13. The mobile station of claim 11, wherein the first set of data comprises at least one of a system identification code (SID) and a network identification code (NID).

14. The mobile station of claim 11, wherein the first home agent is a Mobile Internet Protocol (Mobile IP) home agent.

15. The mobile station of claim 14, wherein the instructions to use the first identifier to register with the first home agent comprise instructions to use the first identifier to conduct a Mobile-IP registration with the first home agent.

16. The mobile station of claim 15, wherein the instructions to use the first identifier to register with the first home agent comprise instructions to use the first identifier to conduct a Mobile-IP registration with the first home agent via a foreign agent.

17. The mobile station of claim 11, wherein the data storage further comprises instructions to scan at least one radio-frequency (RF) channel for data identifying a WWAN.

18. The mobile station of claim 11, wherein the instructions to use the first identifier to register with the first home agent comprise instructions to send a registration request to the first home agent.

19. The mobile station of claim 11, wherein the first home agent is a network access server.

20. The mobile station of claim 11, wherein the mobile station is a mobile station selected from the group consisting of a cellular telephone, a personal digital assistant (PDA), and a laptop computer.

* * * * *